United States Patent
Yamasaki et al.

(10) Patent No.: US 9,985,425 B2
(45) Date of Patent: May 29, 2018

(54) MULTILAYERED HEAT-RECOVERABLE ARTICLE, WIRE SPLICE, AND WIRE HARNESS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Yasutaka Emoto, Sennan-gun (JP); Shouhei Okabe, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 278 days.

(21) Appl. No.: 14/655,131

(22) PCT Filed: Aug. 8, 2014

(86) PCT No.: PCT/JP2014/071016
§ 371 (c)(1),
(2) Date: Jun. 24, 2015

(87) PCT Pub. No.: WO2015/045644
PCT Pub. Date: Apr. 2, 2015

(65) Prior Publication Data
US 2015/0357810 A1    Dec. 10, 2015

(30) Foreign Application Priority Data
Sep. 26, 2013   (JP) ................................. 2013-200658

(51) Int. Cl.
*H02G 3/04*    (2006.01)
*H02G 3/06*    (2006.01)
(Continued)

(52) U.S. Cl.
CPC ........... *H02G 15/1813* (2013.01); *B32B 1/08* (2013.01); *B32B 7/02* (2013.01); *B32B 7/12* (2013.01);
(Continued)

(58) Field of Classification Search
CPC .............. B32B 27/18; B32B 2307/714; B32B 2250/02; B32B 2250/00; B32B 1/08;
(Continued)

(56) References Cited

U.S. PATENT DOCUMENTS 4,085,286 A * 4/1978 Horsma ............... B29C 61/0608
156/273.9
4,206,786 A * 6/1980 Wetmore .............. B29C 61/065
138/137
(Continued)

FOREIGN PATENT DOCUMENTS

CN    1186821 A    7/1998
CN    1228614 A    9/1999
(Continued)

*Primary Examiner* — William H Mayo, III
*Assistant Examiner* — Rhadames J Alonzo Miller
(74) *Attorney, Agent, or Firm* — Drinker Biddle & Reath LLP

(57) ABSTRACT

A multilayered heat-recoverable article according to the present invention includes a cylindrical base material layer and an adhesive layer disposed on an inner peripheral surface of the base material layer, in which the base material layer contains a polyethylene and an oxidation inhibitor, the adhesive layer contains an ethylene-vinyl acetate copolymer and an oxidation inhibitor, the oxidation induction temperature of the base material layer is 255° C. to 270° C., and the
(Continued)

oxidation induction temperature of the adhesive layer is 255° C. or higher.

8 Claims, 3 Drawing Sheets

(51) Int. Cl.

| | |
|---|---|
| *H02G 15/08* | (2006.01) |
| *B32B 27/08* | (2006.01) |
| *H02G 15/18* | (2006.01) |
| *B32B 7/02* | (2006.01) |
| *B32B 1/08* | (2006.01) |
| *B32B 7/12* | (2006.01) |
| *B32B 27/20* | (2006.01) |
| *B32B 27/30* | (2006.01) |
| *B32B 27/32* | (2006.01) |
| *B32B 27/18* | (2006.01) |
| *B32B 27/06* | (2006.01) |
| *H02G 1/14* | (2006.01) |

(52) U.S. Cl.
CPC .............. *B32B 27/06* (2013.01); *B32B 27/08* (2013.01); *B32B 27/18* (2013.01); *B32B 27/20* (2013.01); *B32B 27/30* (2013.01); *B32B 27/306* (2013.01); *B32B 27/308* (2013.01); *B32B 27/32* (2013.01); *B32B 2250/00* (2013.01); *B32B 2250/02* (2013.01); *B32B 2264/10* (2013.01); *B32B 2307/30* (2013.01); *B32B 2307/3065* (2013.01); *B32B 2307/714* (2013.01); *B32B 2307/7265* (2013.01); *B32B 2597/00* (2013.01); *H02G 1/14* (2013.01); *Y10T 428/2935* (2015.01)

(58) Field of Classification Search
CPC ..... B32B 27/308; B32B 27/306; B32B 27/30; B32B 7/12; B32B 7/02; B32B 7/32; H02G 1/14; H02G 15/1813
See application file for complete search history.

(56) References Cited

U.S. PATENT DOCUMENTS

| | | | | | |
|---|---|---|---|---|---|
| 4,383,131 | A | * | 5/1983 | Clabburn | H02G 15/10 156/49 |
| 4,751,121 | A | * | 6/1988 | Kuhnel | B32B 27/32 428/214 |
| 5,013,894 | A | * | 5/1991 | Jensen | B29C 61/0625 174/DIG. 8 |
| 5,271,975 | A | * | 12/1993 | Solano | B29C 53/083 174/74 A |
| 5,406,871 | A | * | 4/1995 | Lambert, Jr. | B29C 61/065 138/103 |
| 5,914,160 | A | * | 6/1999 | Matsufuji | B29C 61/0616 138/118 |
| 6,146,726 | A | * | 11/2000 | Yoshii | B32B 27/08 428/34.9 |
| 2003/0026926 | A1 | * | 2/2003 | Muto | B29C 61/003 428/34.9 |
| 2005/0031811 | A1 | * | 2/2005 | Mehan | B29C 44/348 428/34.9 |
| 2006/0254799 | A1 | * | 11/2006 | Gregorek | H01R 4/70 174/74 A |
| 2007/0015875 | A1 | * | 1/2007 | Globus | C08J 9/0061 525/199 |
| 2007/0149734 | A1 | * | 6/2007 | Sakakibara | H01B 3/445 526/247 |
| 2011/0065867 | A1 | * | 3/2011 | Keung | C08J 5/18 525/240 |
| 2011/0272173 | A1 | * | 11/2011 | Shiotsuki | C08F 8/22 174/110 SR |

FOREIGN PATENT DOCUMENTS

| | | |
|---|---|---|
| EP | 2 937 873 A1 | 10/2015 |
| JP | S60-264229 A | 12/1985 |
| JP | H06-176649 A | 6/1994 |
| JP | H07-32529 A | 2/1995 |
| JP | 08216350 A * | 8/1996 |
| JP | H08-216350 A | 8/1996 |
| JP | 2000-119403 A | 4/2000 |
| JP | 2000-129042 A | 5/2000 |
| JP | 3278913 B2 | 4/2002 |
| JP | 2010-185056 A | 8/2010 |
| JP | 2014-069522 A | 4/2014 |
| WO | WO-2014/097694 A1 | 6/2014 |

* cited by examiner

MULTILAYERED HEAT-RECOVERABLE ARTICLE, WIRE SPLICE, AND WIRE HARNESS

TECHNICAL FIELD

The present invention relates to a multilayered heat-recoverable article, a wire splice, and a wire harness.

BACKGROUND ART

Heat-recoverable articles, such as heat-shrinkable tubes and heat-shrinkable caps, are used as covering for joints between insulated electrical wires, wire terminals, metal pipes, and the like for the purpose of protection, insulation, waterproofing, corrosion protection, and the like. For example, when a joint between insulated electrical wires is covered with a heat-shrinkable tube and heating is performed, the heat-shrinkable tube shrinks, conforms to the shape of the joint, and adheres thereto, and thus the joint can be protected.

Examples of such heat-recoverable articles include a multilayered heat-recoverable article in which an adhesive layer is provided on the inner periphery of a heat-shrinkable base material layer which constitutes an outer peripheral layer. However, in the case where a copper material such as an electrical wire is covered with such a multilayered heat-recoverable article, the multilayered heat-recoverable article becomes degraded because of copper-induced damage in which copper promotes oxidation of the adhesive layer and the base material layer. Accordingly, in an existing technique, degradation of a multilayered heat-recoverable article is prevented by incorporating a copper inhibitor or an oxidation inhibitor into a base material layer which is responsible for the strength of the multilayered heat-recoverable article.

Furthermore, in order to prevent copper-induced damage, a heat-recoverable article has been proposed which includes a base material layer obtained by incorporating a six-component-based stabilizer into polyolefin (refer to Japanese Unexamined Patent Application Publication No. 6-176649).

CITATION LIST

Patent Literature

PTL 1: Japanese Unexamined Patent Application Publication No. 6-176649

SUMMARY OF INVENTION

Technical Problem

However, when a copper inhibitor is incorporated into a base material layer as in the existing technique, production costs increase because the copper inhibitor is expensive. Furthermore, when a large amount of an oxidation inhibitor is incorporated into a base material layer so that oxidation of the base material layer can be prevented satisfactorily, the oxidation inhibitor migrates to the surface of the base material layer, and bloom in which the oxidation inhibitor is crystallized on the surface and bleeding in which the oxidation inhibitor, in a liquid form, oozes out to the surface may occur, resulting in poor appearance.

Furthermore, in the heat-recoverable article described in the patent application publication described above, it is necessary to incorporate six components at a predetermined ratio into polyolefin, which is troublesome, and the heat-recoverable article is difficult to produce, which is inconvenient.

The present invention has been achieved under these circumstances, and it is an object of the invention to provide a multilayered heat-recoverable article in which the occurrence of bloom and bleeding is small, which has excellent resistance to copper-induced damage, and which is easy to produce; and a wire splice and a wire harness each including the multilayered heat-recoverable article.

Solution to Problem

In an aspect of the present invention which has been achieved in order to solve the problem described above, a multilayered heat-recoverable article includes a cylindrical base material layer and an adhesive layer disposed on an inner peripheral surface of the base material layer, in which the base material layer contains a polyethylene and an oxidation inhibitor, the adhesive layer contains an ethylene-vinyl acetate copolymer and an oxidation inhibitor, the oxidation induction temperature of the base material layer is 255° C. to 270° C., and the oxidation induction temperature of the adhesive layer is 255° C. or higher.

In another aspect of the present invention which has been achieved in order to solve the problem described above, a wire splice includes a plurality of wires, each including a conductor and an insulating layer provided on the outside thereof, and a tube obtained by heat-shrinking the multilayered heat-recoverable article made to adhere to a joint in which the conductors of the plurality of wires are connected to each other.

In another aspect of the present invention which has been achieved in order to solve the problem described above, a wire harness includes a plurality of wires, each including a conductor and an insulating layer provided on the outside thereof, and a tube obtained by heat-shrinking the multilayered heat-recoverable article made to adhere to the plurality of wires.

Advantageous Effects of Invention

In the multilayered heat-recoverable article, and the wire splice and the wire harness, each including the multilayered heat-recoverable article, according to the present invention, the occurrence of bloom and bleeding is small, and the multilayered heat-recoverable article, the wire splice, and the wire harness have excellent resistance to copper-induced damage and are easy to produce. As a result, the lifetime of the multilayered heat-recoverable article, the wire splice, and the wire harness can be extended.

DESCRIPTION OF EMBODIMENTS

Figure 1:
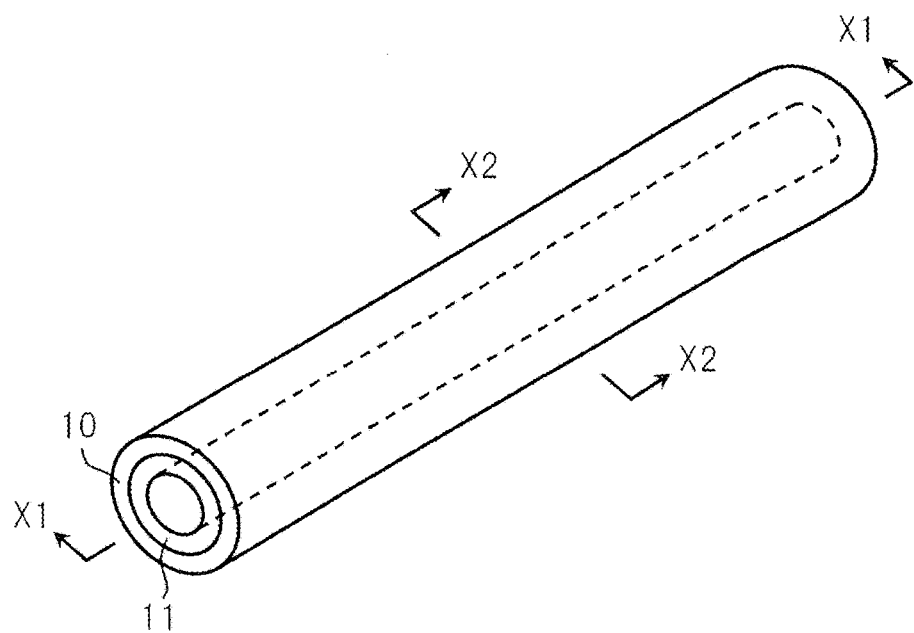
FIG. 1 is a schematic perspective view showing a multilayered heat-recoverable article according to an embodiment of the present invention.

Description of Embodiments of the Present Invention

In an existing multilayered heat-recoverable article, for example, an oxidation inhibitor is incorporated only into a base material layer, and the content thereof is suppressed to such an extent that bloom and bleeding do not occur. In this structure of the multilayered heat-recoverable article, since an adhesive layer does not contain an oxidation inhibitor, the adhesive layer is likely to be oxidized by copper.

Furthermore, since the content of the oxidation inhibitor in the base material layer is suppressed to such an extent that bloom and bleeding do not occur, it is not possible to sufficiently prevent ionized copper from migrating into the base material layer and oxidizing the base material layer or to sufficiently prevent oxygen around the multilayered heat-recoverable article from oxidizing the base material layer, which is inconvenient.

In order to overcome such inconvenience, the present inventors have found that by also incorporating an oxidation inhibitor into the adhesive layer, the multilayered heat-recoverable article is unlikely to become degraded. The reason for this is believed to be that the oxidation inhibitor in the adhesive layer prevents copper from oxidizing the adhesive layer and at the same time, the oxidation inhibitor in the adhesive layer migrates into the base material layer, thus preventing ionized copper which has migrated into the base material layer from oxidizing the base material layer and preventing oxygen around the multilayered heat-recoverable article from oxidizing the base material layer.

Accordingly, even when the amount of an oxidation inhibitor incorporated into the base material layer is decreased to such an extent that bloom and bleeding do not occur, it is conceivable to prevent degradation of the multilayered heat-recoverable article by incorporating an oxidation inhibitor into the adhesive layer.

Furthermore, when the content of the oxidation inhibitor in the adhesive layer is increased, the oxidation induction temperature of the adhesive layer increases, and when the content of the oxidation inhibitor in the base material layer is increased, the oxidation induction temperature of the base material layer increases. Therefore, the present inventors have found that the content range of the oxidation inhibitor in each of the adhesive layer and the base material layer can be determined using, as an index, the oxidation induction temperature of each of the adhesive layer and the base material layer. On the basis of what has been described above, the present inventors have achieved the present invention.

That is, the present invention provides a multilayered heat-recoverable article including a cylindrical base material layer and an adhesive layer disposed on an inner peripheral surface of the base material layer, in which the base material layer contains a polyethylene and an oxidation inhibitor, the adhesive layer contains an ethylene-vinyl acetate copolymer and an oxidation inhibitor, the oxidation induction temperature of the base material layer is 255° C. to 270° C., and the oxidation induction temperature of the adhesive layer is 255° C. or higher.

In the multilayered heat-recoverable article, the oxidation induction temperature of the base material layer is in the range described above, and the oxidation induction temperature of the adhesive layer is equal to or more than the lower limit described above. Therefore, it is possible to suppress occurrence of bloom and bleeding on the outer peripheral surface of the base material layer, and excellent resistance to copper-induced damage is achieved. Furthermore, the multilayered heat-recoverable article can be easily produced by adjusting the content of the oxidation inhibitor in each of the base material layer and the adhesive layer. The term "oxidation induction temperature" refers to the temperature at which the temperature increase due to heat generation reaches a peak when the temperature of a material to be measured is raised from 150° C. at 2° C./min, using a differential scanning calorimeter, in an oxygen atmosphere.

The oxidation inhibitor is preferably a phenol-based oxidation inhibitor or an amine-based oxidation inhibitor. In this case, the resistance to copper-induced damage can be further improved.

In the adhesive layer, the lower limit of the content of the oxidation inhibitor relative to 100 parts by mass of the ethylene-vinyl acetate copolymer is preferably 4 parts by mass, and the upper limit thereof is preferably 14 parts by mass. When the content of the oxidation inhibitor is less than the lower limit, the adhesive layer and the base material layer are likely to be oxidized, and there is a concern that the multilayered heat-recoverable article may be degraded. When the content of the oxidation inhibitor is more than the upper limit, costs remain at high levels.

In the base material layer, the lower limit of the content of the oxidation inhibitor relative to 100 parts by mass of the polyethylene is preferably 1 part by mass, and the upper limit thereof is preferably 5 parts by mass. When the content of the oxidation inhibitor is less than the lower limit, the base material layer is likely to be oxidized, and there is a concern that the multilayered heat-recoverable article may be degraded. When the content of the oxidation inhibitor is more than the upper limit, there is a concern that bloom and bleeding may be likely to occur.

Preferably, the polyethylene of the base material layer is at least one selected from the group consisting of a high-density polyethylene, a low-density polyethylene, a linear low-density polyethylene, and an ethylene-acrylate copolymer. By selecting the structure of the polyethylene of the base material layer in such a manner, the structure of the polyethylene is made similar to the structure of the ethylene-vinyl acetate copolymer used for the adhesive layer. Therefore, even if the oxidation inhibitor concentration of the adhesive layer is higher than the oxidation inhibitor concentration of the base material layer, excessive migration of the oxidation inhibitor from the adhesive layer into the base material layer can be suppressed. Consequently, bleeding and bloom are more unlikely to occur.

Preferably, the adhesive layer further contains an inorganic filler. Thereby, the viscosity of the adhesive layer can be easily adjusted, and the thickness of the adhesive layer can be made uniform when an object is covered with the multilayered heat-recoverable article. As a result, the effect of the oxidation inhibitor in the adhesive layer becomes uniform, and it is possible to further improve the resistance to copper-induced damage.

Preferably, the base material layer further contains a flame retardant. Thereby, the multilayered heat-recoverable article has excellent flame retardance.

Preferably, the base material layer does not contain a copper inhibitor. In the multilayered heat-recoverable article, even if the base material layer does not contain a copper inhibitor, the multilayered heat-recoverable article can have excellent resistance to copper-induced damage. By not incorporating a copper inhibitor into the base material layer, the production costs for the multilayered heat-recoverable article can be reduced.

Furthermore, the present invention covers a wire splice including a plurality of wires, each including a conductor and an insulating layer provided on the outside thereof, and a tube obtained by heat-shrinking the multilayered heat-recoverable article made to adhere to a joint in which the conductors of the plurality of wires are connected to each other.

The wire splice includes a tube obtained by heat-shrinking the multilayered heat-recoverable article which has excellent resistance to copper-induced damage and which is unlikely to be degraded as described above. Therefore, the lifetime of the wire splice can be extended, and it is possible to maintain, for a long period of time, the protection state in protection of wires and a joint therebetween, insulation, waterproofing, corrosion protection, and the like.

Furthermore, the present invention covers a wire harness including a plurality of wires, each including a conductor and an insulating layer provided on the outside thereof, and a tube obtained by heat-shrinking the multilayered heat-recoverable article made to adhere to the plurality of wires.

The wire harness includes a tube obtained by heat-shrinking the multilayered heat-recoverable article which has excellent resistance to copper-induced damage and which is unlikely to be degraded as described above. Therefore, the lifetime of the wire harness can be extended, and it is possible to maintain, for a long period of time, the protection state in protection of wires, insulation, waterproofing, corrosion protection, and the like.

Detailed Description of Embodiments of the Present Invention

Examples of a multilayered heat-recoverable article, a wire splice, and a wire harness according to the present invention will be described with reference to the drawings. It is intended that the present invention is not limited to the examples, but is determined by appended claims, and includes all variations of the equivalent meanings and ranges to the claims.

[Multilayered Heat-Recoverable Article]

Figure 2:
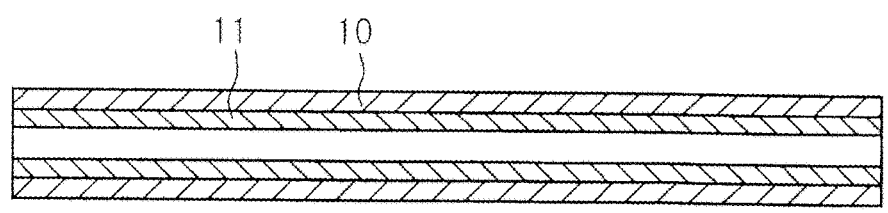
FIG. 2 is a schematic cross-sectional view taken along the line X1-X1 of FIG. 1.
Figure 3:
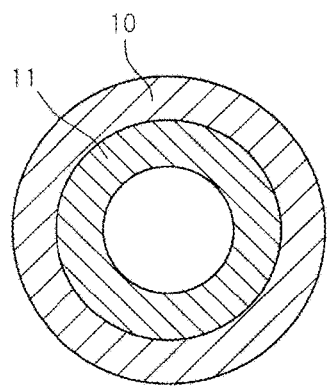
FIG. 3 is a schematic cross-sectional view taken along the line X2-X2 of FIG. 1.

A multilayered heat-recoverable article shown in FIGS. 1 to 3 is used, for example, to cover a joint between insulated electrical wires, a wire terminal, a metal pipe, or the like for the purpose of protection, insulation, waterproofing, corrosion protection, or the like. The multilayered heat-recoverable article includes a cylindrical base material layer 10 and an adhesive layer 11 disposed on an inner periphery of the base material layer 10.

[Base Material Layer]

The base material layer 10 contains a polyethylene, as a main component, and an oxidation inhibitor. The term "main component" refers to a component whose content is highest and, for example, refers to a component whose content is 50% by mass or more. The base material layer 10 is formed as a tube which reduces in diameter when heated. Furthermore, preferably, a flame retardant is added into the base material layer 10 for the purpose of improving flame retardance. Moreover, other additives may be added into the base material layer 10 as necessary. Examples of such additives include a copper inhibitor, a lubricant, a coloring agent, a heat stabilizer, and an ultraviolet absorber.

<Oxidation Induction Temperature of Base Material Layer>

The lower limit of the oxidation induction temperature of the base material layer 10 is 255° C., and preferably 257° C. The upper limit of the oxidation induction temperature of the base material layer 10 is 270° C., and preferably 265° C.

When the oxidation induction temperature is lower than the lower limit, the base material layer 10 is likely to be oxidized, and there is a concern that the multilayered heat-recoverable article may be degraded. When the oxidation induction temperature is higher than the upper limit, because of the large content of the oxidation inhibitor, there is a concern that bloom and bleeding may occur.

<Polyethylene>

As the polyethylene, at least one selected from the group consisting of a high-density polyethylene, a low-density polyethylene, a linear low-density polyethylene, and an ethylene-acrylate copolymer is preferable. By using such a polyethylene, bloom and bleeding are more unlikely to occur in the multilayered heat-recoverable article, and the multilayered heat-recoverable article is more likely to have excellent resistance to copper-induced damage. Note that as the ethylene-acrylate copolymer, an ethylene-acrylate copolymer in which the number of ethylene-derived units is larger than the number of acrylate units is preferable. Furthermore, as the polyethylene, other than those described above, an ultralow-density polyethylene, an olefin-based elastomer in which the content of ethylene-derived units is 50% or more, or the like can be used.

The lower limit of the melt flow rate (MFR) of the polyethylene is preferably 0.1 g/10 min, and more preferably 0.7 g/10 min. When the MFR is less than the lower limit, a large pressure is needed to form the base material layer 10 by extrusion. On the other hand, the upper limit of the MFR of the polyethylene is preferably 10.0 g/10 min, and more preferably 4.0 g/10 min. When the MFR is more than the upper limit, the resin flows excessively, which makes it difficult to obtain a uniform shape of the base material layer. Furthermore, the lower limit of the melting point (mp) of the polyethylene is preferably 100° C., and more preferably 105° C. When the mp is less than the lower limit, the multilayered heat-recoverable article heat-shrinks at a low temperature, thus being difficult to handle. On the other hand, the upper limit of the mp of the polyethylene is preferably 135° C., and more preferably 132° C. When the mp is more than the upper limit, the temperature at which the multilayered heat-recoverable article is heat-shrunk increases, and there is a concern that an article covered with the multilayered heat-recoverable article may be adversely affected. Note that the MFR refers to the value measured, using an extrusion plastometer stipulated in JIS-K6760: 1997, under the conditions at a temperature of 190° C. and a load of 21.6 kg in accordance with JIS-K7210:1997. Furthermore, the mp refers to the melting peak temperature measured, using a differential scanning calorimeter (DSC), at a rate of temperature increase of 10° C./min in accordance with the method stipulated in JIS-K7121.

<Oxidation Inhibitor>

As the oxidation inhibitor, a phenol-based oxidation inhibitor or an amine-based oxidation inhibitor is preferable. By using any of these oxidation inhibitors, it is possible to further improve resistance to copper-induced damage. Furthermore, as the oxidation inhibitor, in addition to the oxidation inhibitor described above, a sulfur-based oxidation inhibitor, a phosphite ester-based oxidation inhibitor, and the like can be used alone or in combination.

Furthermore, the lower limit of the content of the oxidation inhibitor in the base material layer 10 is preferably 1 part by mass, and more preferably 1.5 parts by mass, relative to 100 parts by mass of the polyethylene. On the other hand, the upper limit of the content of the oxidation inhibitor is preferably 5 parts by mass, and more preferably 3 parts by mass, relative to 100 parts by mass of the polyethylene. When the content of the oxidation inhibitor is less than the lower limit, the base material layer 10 is likely to be oxidized, and there is a concern that the multilayered heat-recoverable article may be degraded. When the content of the oxidation inhibitor is more than the upper limit, there is a concern that bloom and bleeding may occur.

(Phenol-Based Oxidation Inhibitor)

Examples of the phenol-based oxidation inhibitor include pentaerythritol tetrakis[3-(3,5-di-tert-butyl-4-hydroxyphenyl)propionate], tetrakis-[methylene-3-(3'5'-di-tert-butyl-4'-hydroxyphenyl)propionate]methane, triethylene glycol-bis[3-(3-tert-butyl-5-methyl-4-hydroxyphenyl)propionate], 6-(4-hydroxy-3,5-di-tert-butyl-anilino)-2,4-bis-octyl-thio-1,3,5-triazine, and the like.

(Amine-Based Oxidation Inhibitor)

Examples of the amine-based oxidation inhibitor include 4,4'-($\alpha$,$\alpha$-dimethylbenzyl)diphenylamine, polymers of 2,2,4-trimethyl-1,2-dihydroquinoline, 6-ethoxy-2,2,4-trimethyl-1,2-dihydroquinoline, N-(1,3-dimethylbutyl)-1V-phenyl-1,4-phenylenediamine, N-isopropyl-N'-phenyl-1,4-phenylenediamine, and the like.

<Flame Retardant>

Examples of the flame retardant include chlorine-based flame retardants, such as chlorinated paraffin, chlorinated polyethylene, chlorinated polyphenyl, and perchloropentacyclodecane; bromine-based flame retardants, such as 1,2-bis(2,3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, and ammonium bromide; phosphate esters or phosphorus compounds, such as triallyl phosphate, alkyl aryl phosphate, alkyl phosphate, dimethyl phosphonate, phosphorinate, halogenated phosphorinate ester, trimethyl phosphate, tributyl phosphate, trioctyl phosphate, tributoxyethyl phosphate, octyldiphenyl phosphate, tricresyl phosphate, cresylphenyl phosphate, triphenyl phosphate, tris(chloroethyl)phosphate, tris(2-chloropropyl)phosphate, tris(2,3-dichloropropyl)phosphate, tris(2,3-dibromopropyl) phosphate, tris(bromochloropropyl)phosphate, bis(2,3-dibromopropyl)2,3-diehloropropyl phosphate, bis(chloropropyl)monooctyl phosphate, polyphosphonate, polyphosphate, aromatic polyphosphate, dibromoneopentyl glycol, and aluminum tris(diethylphosphinate); polyols, such as phosphonate-type polyols, phosphate-type polyols, and halogen-containing polyols; metal powders or inorganic compounds, such as aluminum hydroxide, magnesium hydroxide, magnesium carbonate, antimony trioxide, antimony trichloride, zinc borate, antimony borate, boric acid, antimony molybdate, molybdenum oxide, phosphorus-nitrogen compounds, calcium-aluminum silicate, zirconium compounds, tin compounds, dawsonite, calcium aluminate hydrate, copper oxide, metallic copper powder, calcium carbonate, and barium metaborate; nitrogen compounds, such as melamine cyanurate, triazine, isocyanurate, urea, and guanidine; and other compounds, such as silicone polymers, ferrocene, fumaric acid, and maleic acid. Among these, halogen-based flame retardants, such as bromine-based flame retardants and chlorine-based flame retardants, are preferable. Bromine-based flame retardants and chlorine-based flame retardants may be used alone or in combination of two or more.

Regarding the range of the content of the flame retardant, for example, in the case of a bromine-based flame retardant, the lower limit is preferably 1 part by mass, and more preferably 5 parts by mass, relative to 100 parts by mass of the polyethylene. The upper limit is preferably 50 parts by mass, and more preferably 40 parts by mass, relative to 100 parts by mass of the polyethylene. When the content of the flame retardant is less than the lower limit, there is a concern that the effect of imparting flame retardance may not be obtained. Furthermore, when the content of the flame retardant is more than the upper limit, there is a concern that the toughness and elongation required for the heat-recoverable article may be degraded.

<Copper Inhibitor>

Examples of the copper inhibitor include 3-(N-salicyloyl)amino-1,2,4-triazole, decamethylene dicarboxylic acid disalicyloyl hydrazide, 2,3-bis[3-(3,5-di-tert-butyl-4-hydroxyphenyl)propionyl]propionohydrazide, and the like. By incorporating a copper inhibitor into the base material layer 10, copper-induced damage prevention is anticipated. However, in the multilayered heat-recoverable article, since an oxidation inhibitor is incorporated in each of the base material layer 10 and the adhesive layer 11, the copper inhibitor is not necessarily used. By not using such an expensive copper inhibitor, the production costs of the multilayered heat-recoverable article can be reduced.

Regarding the range of the content of the copper inhibitor, for example, in the case where the copper inhibitor is 3-(N-salicyloyl)amino-1,2,4-triazole, the lower limit is preferably 0.5 parts by mass, and more preferably 1 part by mass, relative to 100 parts by mass of the polyethylene. The upper limit is preferably 10 parts by mass, and more preferably 5 parts by mass, relative to 100 parts by mass of the polyethylene. When the content of the copper inhibitor is less than the lower limit, there is a concern that the effect of the copper inhibitor may not be obtained. Furthermore, even when the content of the copper inhibitor is more than the upper limit, it is not possible to improve the effect of preventing copper-induced damage.

[Adhesive Layer]

The adhesive layer 11 contains an ethylene-vinyl acetate copolymer, as a main component, and an oxidation inhibitor. The adhesive layer 11 enhances adhesion of the base material layer 10 to a portion to be covered with the multilayered heat-recoverable article and improves waterproofness or the like. Furthermore, preferably, an inorganic filler is added into the adhesive layer 11 for the purpose of adjusting the viscosity after being formed into the multilayered heat-recoverable article. Moreover, other additives may be added into the adhesive layer 11 as necessary. Examples of such additives include a copper inhibitor, a deterioration inhibitor, a viscosity characteristics improving agent, a flame retardant, a lubricant, a coloring agent, a heat stabilizer, an ultraviolet absorber, a gluing agent, and the like.

<Oxidation Induction Temperature of Adhesive Layer>

The lower limit of the oxidation induction temperature of the adhesive layer 11 is 255° C., and preferably 258° C.

Furthermore, the upper limit of the oxidation induction temperature of the adhesive layer 11 is preferably 270° C., and more preferably 265° C. When the oxidation induction temperature is lower than the lower limit, the adhesive layer 11 and the base material layer 10 are likely to be oxidized, and there is a concern that the multilayered heat-recoverable article may be degraded. Furthermore, even when the oxidation induction temperature is higher than the upper limit, it is not possible to improve the effect of inhibiting oxidation of the adhesive layer 11 and the base material layer 10.

<Ethylene-Vinyl Acetate Copolymer>

The lower limit of the content of vinyl acetate in the ethylene-vinyl acetate copolymer is preferably 12% by mass, more preferably 15% by mass, and still more preferably 19% by mass. The upper limit of the content of vinyl acetate is preferably 46% by mass, more preferably 35% by mass, and still more preferably 30% by mass. When the content of vinyl acetate is less than the lower limit, there is a concern that sufficient flexibility may not be obtained. On the other hand, when the content of vinyl acetate is more than the upper limit, there is a concern that the adhesive composition for forming the adhesive layer 11 may stick to a die, a mold, or the like during extrusion of the adhesive layer 11, resulting in a difficulty in handling.

The lower limit of the MFR of the ethylene-vinyl acetate copolymer is preferably 50 g/10 min, and more preferably 100 g/10 min. When the MFR is less than the lower limit, a large pressure is needed to form the adhesive layer 11 by extrusion. Furthermore, the upper limit of the MFR of the ethylene-vinyl acetate copolymer is preferably 600 g/10 min, and more preferably 500 g/10 min. When the MFR is more than the upper limit, the resin flows excessively, which makes it difficult to obtain a uniform shape of the adhesive layer.

<Oxidation Inhibitor>

As the oxidation inhibitor of the adhesive layer 11, the same oxidation inhibitor as that of the base material layer 10 can be used.

Furthermore, the lower limit of the content of the oxidation inhibitor in the adhesive layer 11 is preferably 4 parts by mass, and more preferably 6 parts by mass, relative to 100 parts by mass of the ethylene-vinyl acetate copolymer. On the other hand, the upper limit of the content of the oxidation inhibitor is preferably 14 parts by mass, and more preferably 9 parts by mass, relative to 100 parts by mass of the ethylene-vinyl acetate copolymer. When the content of the oxidation inhibitor is less than the lower limit, the adhesive layer 11 and the base material layer 10 are likely to be oxidized, and there is a concern that the multilayered heat-recoverable article may be degraded. Furthermore, even when the content of the oxidation inhibitor is more than the upper limit, it is not possible to improve the effect of inhibiting oxidation of the adhesive layer 11 and the base material layer 10.

<Inorganic Filler>

Examples of the inorganic filler include organically treated layered silicate, organically treated swelling mica, calcium carbonate, carbon, and the like. By incorporating the inorganic filler, the viscosity of the adhesive layer 11 can be easily adjusted, and the thickness of the adhesive layer 11 can be made uniform. Consequently, the effect caused by the oxidation inhibitor in the adhesive layer 11 is made uniform, and it is possible to further improve the resistance to copper-induced damage.

Regarding the range of the content of the inorganic filler, for example, in the case where the inorganic filler is organically treated layered silicate, the lower limit is preferably 0.5 parts by mass, and more preferably 2 part by mass, relative to 100 parts by mass of the ethylene-vinyl acetate copolymer. The upper limit is preferably 40 parts by mass, and more preferably 30 parts by mass, relative to 100 parts by mass of the ethylene-vinyl acetate copolymer. When the content of the inorganic filler is less than the lower limit, there is a concern that the effect of the inorganic filler may not be obtained. Furthermore, when the content of the inorganic filler is more than the upper limit, there is a concern that the flexibility of the adhesive layer may be degraded.

(Organically Treated Layered Silicate)

The organically treated layered silicate is obtained by organically treating a layered silicate (clay mineral, or clay), such as montmorillonite, bentonite, or smectite. Interlayer cations, such as magnesium ions, sodium ions, or calcium ions, are intercalated between adjacent planar silicate layers which are stacked in a layered manner, and a layered crystal structure is maintained. The interlayer cations are ion-exchanged with organic cations by organically treating the layered silicate. When the organic compound is chemically bound to the surfaces of planar silicate layers and introduced (intercalated) between the adjacent layers in such a manner, the interlayer distance increases between the adjacent planar silicate layers, and thus dispersibility in the thermoplastic resin is improved. As the layered silicate, either a natural material or a synthetic material can be used.

<Copper Inhibitor>

As the copper inhibitor, the same copper inhibitor as that of the base material layer 10 can be used. By incorporating a copper inhibitor into the adhesive layer 11, copper-induced damage prevention is anticipated. However, in the multilayered heat-recoverable article, since an oxidation inhibitor is incorporated in each of the base material layer 10 and the adhesive layer 11, the copper inhibitor may not be used. By not using such an expensive copper inhibitor, the production costs of the multilayered heat-recoverable article can be reduced.

<Deterioration Inhibitor>

The deterioration inhibitor inhibits deterioration of an adherend to which the multilayered heat-recoverable article is made to adhere. Typically, the deterioration inhibitor inhibits occurrence of cracks in the insulating layer due to basic components contained in the insulating layer of the insulated electrical wire or the adhesive layer 11 of the multilayered heat-recoverable article. The deterioration inhibitor can also serve as a viscosity characteristics improving agent. The deterioration inhibitor may be selected depending on the factors that cause deterioration of the adherend. For example, in the case where deterioration of the adherend due to basic components is inhibited, a compound that inhibits dehydrochlorination reaction due to basic components, or a compound capable of capturing or neutralizing hydrogen chloride, chloride ions, or the like generated by hydrochloric acid reaction can be used. Examples of such a deterioration inhibitor include activated clay, hydrotalcite, a phosphorus-containing oxidation inhibitor (with an acid value of 10 mgKOH/g or more), and the like. By incorporating such a deterioration inhibitor into the adhesive layer 11, for example, a nitrogen-containing compound can be adsorbed, anions can be intercalated, or hydrogen chloride generated by dehydrochlorination reaction can be captured, and thus, it is possible to inhibit deterioration of the adherend due to basic components of the adhesive layer 11.

[Method for Producing Multilayered Heat-Recoverable Article]

A multilayered heat-recoverable article can be produced, for example, through the following steps:

(1) a step of preparing a base material layer resin composition for forming the base material layer 10 and an adhesive composition for forming the adhesive layer 11, (2) a step of forming a multilayered extruded article by extruding the base material layer resin composition and the adhesive composition using a melt extruder, and (3) a step of expanding the diameter of the multilayered extruded article to produce a multilayered heat-recoverable article.

(1) Step of Preparing Compositions

The base material layer resin composition can be prepared by mixing a resin component, an oxidation inhibitor, and optionally, an additive with a melt mixer. As the melt mixer, a known mixer, such as an open roll mixer, a Banbury mixer, a pressure kneader, a single screw mixer, or a multi-screw mixer, can be used.

The adhesive composition can be prepared by mixing an ethylene-vinyl acetate copolymer, an oxidation inhibitor, and an additive according to need using a melt mixer. As the melt mixer, the same mixer as that used for the preparation of the base material layer resin composition can be used.

(2) Step of Forming Multilayered Extruded Article

A multilayered extruded article is formed by co-extruding the base material layer resin composition and the adhesive composition using a known melt extruder such that an inner layer corresponding the adhesive layer 11 is disposed on the inner peripheral surface of an outer layer corresponding to the base material layer 10. In the multilayered extruded article, the material constituting the outer layer may be crosslinked to improve heat resistance. Crosslinking can be performed, for example, by a method of crosslinking using irradiation with ionizing radiation, chemical crosslinking, thermal crosslinking, or the like.

The size of the multilayered extruded article can be designed according to intended use or the like. Regarding the size of the layer corresponding to the base material layer 10 of the multilayered extruded article, for example, the inside diameter is 1.0 to 30 mm, and the thickness is 0.1 to 10 mm. Regarding the size of the layer corresponding to the adhesive layer 11 of the multilayered extruded article, for example, the inside diameter is 0.1 to 10 mm, and the thickness is 0.1 to 8.5 mm.

(3) Step of Expanding Diameter of Multilayered Extruded Article

The expansion of the diameter of the multilayered extruded article is performed by heating the multilayered extruded article to a temperature equal to or higher than the melting point, and in that state, expanding the multilayered extruded article to a predetermined inside diameter by a method of introducing compressed air thereinto, or the like, followed by cooling to fix the shape. The expansion of the diameter of the multilayered extruded article is performed, for example, such that the multilayered extruded article is expanded to about two to four times the inside diameter. By performing expansion of the diameter of the multilayered extruded article and fixing the shape in such a manner, a multilayered heat-recoverable article is obtained.

[Advantages]

In the multilayered heat-recoverable article, the oxidation induction temperature of the base material layer 10 is in the range described above, and the oxidation induction temperature of the adhesive layer 11 is equal to or more than the lower limit described above. Therefore, it is possible to suppress occurrence of bloom and bleeding on the outer peripheral surface of the base material layer 10, and excellent resistance to copper-induced damage is achieved.

Furthermore, the multilayered heat-recoverable article can be easily produced by adjusting the content of the oxidation inhibitor in each of the base material layer 10 and the adhesive layer 11.

[Wire Splice and Wire Harness]

The multilayered heat-recoverable article of the present invention can be used for protection, insulation, waterproofing, corrosion protection, or the like of a wire, such as a PE electrical wire or a PE cable in which an insulating layer covering a conductor is composed of polyethylene (PE), or a PVC electrical wire or a PVC cable whose insulating layer is composed of polyvinyl chloride (PVC). Specifically, the multilayered heat-recoverable article can be used for a wire splice and a wire harness.

Figure 4:
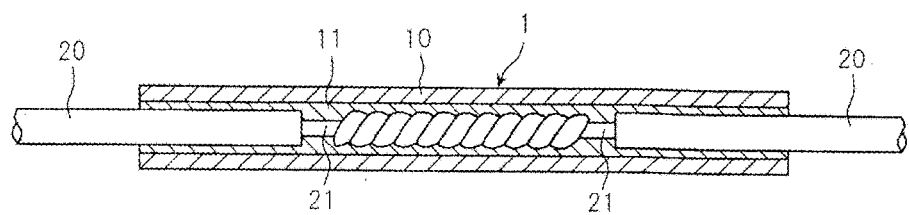
FIG. 4 is a schematic cross-sectional view, which corresponds to FIG. 2, showing a wire splice according to an embodiment of the present invention.
Figure 5:
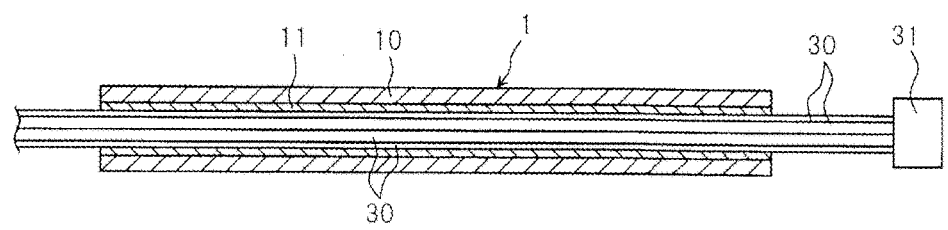
FIG. 5 is a schematic cross-sectional view, which corresponds to FIG. 2, showing a wire harness according to an embodiment of the present invention.
Figure 6:
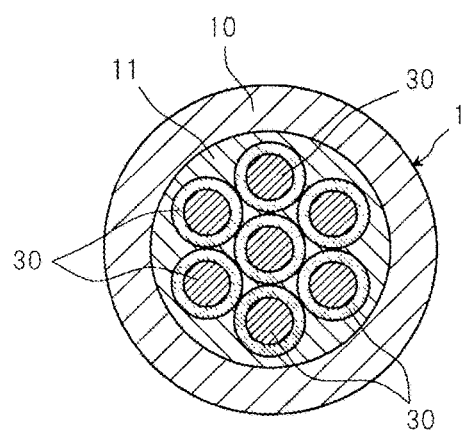
FIG. 6 is a schematic cross-sectional view, which corresponds to FIG. 3, showing the wire harness shown in FIG. 5.

FIG. 4 shows an example in which a multilayered heat-recoverable article is used in a wire splice, and FIGS. 5 and 6 show an example in which a multilayered heat-recoverable article is used in a wire harness.

In the wire splice shown in FIG. 4, conductor wires 21 of a pair of wires 20 are twisted and connected to each other, and a tube 1 obtained by heat-shrinking the multilayered heat-recoverable article shown in FIG. 1 is made to adhere to the joint thereof. The wire 20 is an insulated electrical wire or cable, such as a PE electrical wire or PVC electrical wire. In the wire 20, for example, an insulating layer located as an outermost layer contains, as a main component, polyvinyl chloride. The content of polyvinyl chloride in the insulating layer is, for example, 50% to 95% by mass. In such a wire splice, the tube 1 can contribute to protection, insulation, waterproofing, corrosion protection, or the like of the joint.

In the wire harness shown in FIGS. 5 and 6, a plurality of wires 30 are tied together by a tube 1 obtained by heat-shrinking the multilayered heat-recoverable article shown in FIG. 1, and a multi-pin connector 31 is provided on the ends of the plurality of wires 30. The wire 30 is the same as the wire 20 of the wire splice shown in FIG. 4. In the wire harness, the tube 1 not only has a function of tying the wires 30 together, but also has a function of protecting the individual wires 30 and other functions.

Note that, in some cases, the wire splice and the wire harness according to the present invention may not be strictly distinguished from each other. A wire splice may also serve as a wire harness in some cases.

Other Embodiments

Figure 7:
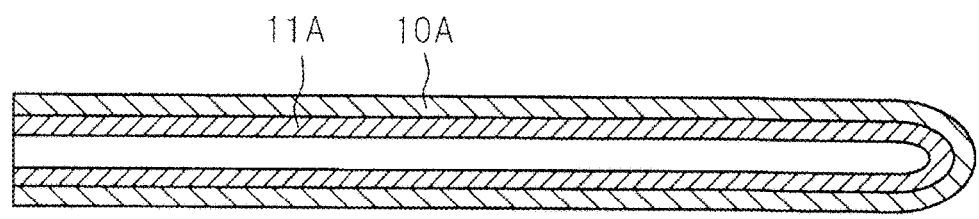
FIG. 7 is a schematic cross-sectional view, which corresponds to FIG. 2, showing a multilayered heat-recoverable article according to another embodiment of the present invention.

The multilayered heat-recoverable article of the present invention is not limited to the multilayered heat-recoverable article shown in FIGS. 1 to 3 in which the base material layer 10 is formed in a tubular shape, but may be, for example, a multilayered heat-recoverable article shown in FIG. 7 in which a base material layer 10A is formed in a cap shape. In the multilayered heat-recoverable article, one end of the multilayered heat-recoverable article is subjected to heat shrinkage and closed, and thereby, an adhesive layer 11A is disposed on the inner peripheral surface of the cap-shaped base material layer 10A. This multilayered heat-recoverable article can be suitably used, for example, for wire terminal treatment.

The multilayered heat-recoverable article of the present invention may be formed by separately extruding the base material layer and the adhesive layer. In such a case, the adhesive layer is set inside the base material layer which has been expanded after extrusion. The resulting multilayered heat-recoverable article is used by being made to adhere to an adherend, and shrinking the base material layer.

In the wire splice of the present invention, as long as the multilayered heat-recoverable article is made to adhere to a joint between wires, a wire may be connected to a plurality of wires, a plurality of wires may be connected to a plurality of wires, or ends of a plurality of wires may be connected collectively as in wire terminal treatment. Other configurations may also be used.

The wire harness of the present invention may be configured as a so-called flat harness in which a plurality of wires are tied together in a planar shape. Other configurations may also be used.

EXAMPLES

The present invention will be described more in detail on the basis of examples. However, it is to be understood that the present invention is not limited to the examples.

EXAMPLES AND COMPARATIVE EXAMPLES

Multilayered heat-recoverable articles of examples and comparative examples were produced by varying the compositions of the base material layer and the adhesive layer. Specifically, the multilayered heat-recoverable articles were produced through the step of forming a multilayered extruded article and the step of expanding the diameter of the multilayered extruded article described above, using the compositions shown in Tables I and II. In the layer corresponding to the base material layer 10 of each multilayered extruded article, the outside diameter was set at 4.6 mm, the inside diameter was set at 2.8 mm, and the thickness was set at 0.9 mm. Furthermore, in the layer corresponding to the adhesive layer 11 of each multilayered extruded article, the outside diameter was set at 2.8 mm, the inside diameter was set at 0.6 mm, and the thickness was set at 1.1 mm. Subsequently, the diameter of each multilayered extruded article was expanded such that the outside diameter was 7.5 mm by the step of expanding the diameter. In such a manner, multilayered heat-recoverable articles of Nos. 1 to 11 were produced as examples, and multilayered heat-recoverable articles of Nos. 12 to 17 were produced as comparative examples.

TABLE I

| | | | Test No. | | | | | | | | |
|---|---|---|---|---|---|---|---|---|---|---|---|
| | | | 1 | 2 | 3 | 4 | 5 | 6 | 7 | 8 | 9 |
| Base material layer | Addition amount (parts by mass) | High-density polyethylene | 50 | 50 | 50 | 50 | — | 50 | 50 | 50 | — |
| | | Low-density polyethylene | 50 | 50 | 50 | 50 | — | 50 | 50 | 50 | — |
| | | Linear low-density polyethylene | — | — | — | — | 100 | — | — | — | — |
| | | Ethylene-ethyl acrylate copolymer | — | — | — | — | — | — | — | — | 100 |
| | | Oxidation inhibitor 1 | 2 | 1 | 5 | 2 | 2 | 2 | 2 | 2 | 2 |
| | | Copper inhibitor | — | — | — | — | — | — | — | — | — |
| | | Bromine-based flame retardant | — | — | — | — | — | 40 | — | — | — |
| | | Antimony trioxide | — | — | — | — | — | 20 | — | — | — |
| | Oxidation induction temperature (° C.) | | 260 | 255 | 270 | 260 | 259 | 259 | 260 | 260 | 258 |
| Adhesive layer | Addition amount (parts by mass) | Ethylene-vinyl acetate copolymer 1 | 100 | 100 | 100 | 100 | 100 | 100 | — | 100 | 100 |
| | | Ethylene-vinyl acetate copolymer 2 | — | — | — | — | — | — | 100 | — | — |
| | | Oxidation inhibitor 1 | 7 | 7 | 7 | — | 7 | 7 | 7 | 7 | 7 |
| | | Oxidation inhibitor 2 | — | — | — | 5 | — | — | — | — | — |
| | | Organically treated layered silicate | — | — | — | — | — | — | — | 10 | — |
| | Oxidation induction temperature (° C.) | | 259 | 259 | 259 | 255 | 259 | 259 | 260 | 258 | 259 |
| Test results | Aging test in contact with copper | Elongation evaluation | A | A | A | A | A | A | A | A | A |
| | | Elongation (%) | >500 | 450 | >500 | >500 | >500 | 400 | >500 | 450 | >500 |
| | Bloom confirmation 1 | | A | A | A | A | A | A | A | A | A |
| | Bloom confirmation 2 | | A | A | A | A | A | A | A | A | A |

TABLE II

| | | | Test No. | | | | | | | |
|---|---|---|---|---|---|---|---|---|---|---|
| | | | 10 | 11 | 12 | 13 | 14 | 15 | 16 | 17 |
| Base material layer | Addition amount (parts by mass) | High-density polyethylene | 50 | 50 | 50 | 50 | 50 | 50 | 50 | — |
| | | Low-density polyethylene | 50 | 50 | 50 | 50 | 50 | 50 | 50 | — |
| | | Linear low-density polyethylene | — | — | — | — | — | — | — | — |

TABLE II-continued

|  |  |  | Test No. | | | | | | | |
| --- | --- | --- | --- | --- | --- | --- | --- | --- | --- | --- |
|  |  |  | 10 | 11 | 12 | 13 | 14 | 15 | 16 | 17 |
|  |  | Ethylene-ethyl acrylate copolymer | — | — | — | — | — | — | — | 100 |
|  |  | Oxidation inhibitor 1 | 2 | 2 | 2 | 12 | 7 | 2 | 2 | 7 |
|  |  | Copper inhibitor | — | — | — | — | — | 2 | — | — |
|  |  | Bromine-based flame retardant | — | — | — | — | — | — | — | — |
|  |  | Antimony trioxide | — | — | — | — | — | — | — | — |
|  | Oxidation induction temperature (° C.) |  | 260 | 260 | 260 | 278 | 273 | 261 | 260 | 273 |
| Adhesive layer | Addition amount (parts by mass) | Ethylene-vinyl acetate copolymer 1 | 100 | 100 | 100 | 100 | 100 | 100 | 100 | 100 |
|  |  | Ethylene-vinyl acetate copolymer 2 | — | — | — | — | — | — | — | — |
|  |  | Oxidation inhibitor 1 | 10 | 13 | 3 | 3 | 3 | 3 | 5 | 3 |
|  |  | Oxidation inhibitor 2 | — | — | — | — | — | — | — | — |
|  |  | Organically treated layered silicate | — | — | — | — | — | — | — | — |
|  | Oxidation induction temperature (° C.) |  | 264 | 269 | 252 | 252 | 252 | 252 | 254 | 252 |
| Test results | Aging test in contact with copper | Elongation evaluation | A | A | B | A | B | B | B | B |
|  |  | Elongation (%) | >500 | >500 | 25 | >500 | 75 | 50 | 75 | 75 |
|  | Bloom confirmation 1 |  | A | A | A | B | A | A | A | A |
|  | Bloom confirmation 2 |  | A | A | A | B | B | A | A | B |

The details of the components in Tables I and II will be described below. The MFR shown below was measured, using an extrusion plastometer stipulated in JIS-K6760:1997, under the conditions at a temperature of 190° C. and a load of 21.6 kg in accordance with JIS-K7210:1997.

High-density polyethylene: MFR 0.8 g/10 min, mp 130° C., density 0.95 g/ml

Low-density polyethylene: MFR 1.5 g/10 min, mp 108° C., density 0.92 g/ml

Linear low-density polyethylene: MFR 0.8 g/10 min, mp 120° C., density 0.92 g/ml Ethylene-ethyl acrylate copolymer: MFR 0.4 g/10 min, mp 104° C.

Copper inhibitor: 3-(N-salicyloyl)amino-1,2,4-triazole

Bromine-based flame retardant: 1,2-bis(2,3,4,5,6-pentabromophenyl)ethane

Ethylene-vinyl acetate copolymer 1: vinyl acetate content 28 wt %, MFR 150 g/10 min Ethylene-vinyl acetate copolymer 2: vinyl acetate content 28 wt %, MFR 400 g/10 min Oxidation inhibitor 1: phenol-based oxidation inhibitor, pentaerythritol tetrakis[3-(3,5-di-tert-butyl-4-hydroxyphenyl)propionate]

Oxidation inhibitor 2: amine-based oxidation inhibitor, 4,4'(α,α-dimethylbenzyl)diphenylamine Organically treated layered silicate: layered silicate ("OSMOS N" manufactured by Shiraishi Kogyo Kaisha, Ltd. <specific surface 9 m$^2$/g>) treated with dimethyl distearyl ammonium chloride <Oxidation Induction Temperatures of Base Material Layer and Adhesive Layer>

The oxidation induction temperatures of the base material layer and the adhesive layer of each of the multilayered heat-recoverable articles of Nos. 1 to 17 are shown in Tables I and II. The oxidation induction temperature was determined as the temperature at which the temperature increase due to heat generation reached a peak when the temperature was raised from 150° C. at 2° C./min, using a differential scanning calorimeter ("TA-60" manufactured by Shimadzu Corporation), in an oxygen atmosphere.

<Evaluation of Multilayered Heat-Recoverable Article>

In order to evaluate the multilayered heat-recoverable articles of Nos. 1 to 17, an aging test in contact with copper and bloom confirmation were performed. The evaluation results are shown in Tables I and II. The details of the aging test in contact with copper and the bloom confirmation are as follows.

(Aging Test in Contact with Copper)

A 1.0-mm-diameter copper bar was covered with a multilayered heat-recoverable article, and heating was performed at 150° C. for 2 minutes to shrink the heat-recoverable article. Then, heating was performed at 158° C. for 168 hours, and the copper bar was pulled out of the heat-recoverable article. The heat-recoverable article was subjected to a tensile test, and elongation was measured. The test speed was set at 500 mm/min. In the case where the elongation was 100% or more, the article was evaluated as passed and indicated as "A", and in the case where the elongation was less than 100%, the article was evaluated as failed and indicated as "B".

(Bloom Confirmation 1)

In the case where bloom and bleeding did not occur on the surface of a multilayered heat-recoverable article at the end of the expansion step, the article was evaluated as passed and indicated as "A", and in the case where bloom or bleeding occurred on the surface, the article was evaluated as failed and indicated as "B".

(Bloom Confirmation 2)

In the case where bloom and bleeding did not occur on the surface of a multilayered heat-recoverable article after storing at room temperature for 3 months, the article was evaluated as passed and indicated as "A", and in the case where bloom or bleeding occurred on the surface, the article was evaluated as failed and indicated as "B".

(Results)

In the multilayered heat-recoverable articles of Nos. 1 to 11, the elongation in the aging test in contact with copper was 100% or more and the test result was passed, and the test results in bloom confirmation 1 and bloom confirmation 2 were also passed. On the other hand, in the multilayered heat-recoverable articles of Nos. 12 to 17, the test result was failed in either one of the aging test in contact with copper, bloom confirmation 1, and bloom confirmation 2.

Furthermore, since the multilayered heat-recoverable articles of Nos. 1 to 11 pass the high-temperature test, such as the aging test in contact with copper, the multilayered heat-recoverable articles of Nos. 1 to 11 are anticipated to satisfy the heat resistance at 125° C. in the UL standard.

INDUSTRIAL APPLICABILITY

In the multilayered heat-recoverable article, and the wire splice and the wire harness, each including the multilayered heat-recoverable article, according to the present invention, the occurrence of bloom and bleeding is small, and the multilayered heat-recoverable article, the wire splice, and the wire harness have excellent resistance to copper-induced damage and are easy to produce. As a result, the lifetime of the multilayered heat-recoverable article, the wire splice, and the wire harness can be extended.

REFERENCE SIGNS LIST 1 tube
10, 10A base material layer
11, 11A adhesive layer
20 wire
21 conductor wire
30 wire
31 multi-pin connector

The invention claimed is:

1. A multilayered heat-recoverable article comprising:
a cylindrical base material layer; and
an adhesive layer disposed on an inner peripheral surface of the base material layer,
wherein the base material layer contains a polyethylene and an oxidation inhibitor,
the adhesive layer contains an ethylene-vinyl acetate copolymer whose content is 50% by mass or more, and an oxidation inhibitor,
the oxidation induction temperature of the base material layer is 255° C. to 270° C., and
the oxidation induction temperature of the adhesive layer is 255° C. or higher, and
wherein, in the adhesive layer, the content of the oxidation inhibitor relative to 100 parts by mass of the ethylene-vinyl acetate copolymer is 4 to 14 parts by mass, and
wherein, in the base material layer, the content of the oxidation inhibitor relative to 100 parts by mass of the polyethylene is 1 to 5 parts by mass.

2. The multilayered heat-recoverable article according to claim 1, wherein the oxidation inhibitor is a phenol-based oxidation inhibitor or an amine-based oxidation inhibitor.

3. The multilayered heat-recoverable article according to claim 1, wherein the polyethylene of the base material layer is at least one selected from the group consisting of a high-density polyethylene, a low-density polyethylene, a linear low-density polyethylene, and an ethylene-acrylate copolymer.

4. The multilayered heat-recoverable article according to claim 1, wherein the adhesive layer further contains an inorganic filler.

5. The multilayered heat-recoverable article according to claim 1, wherein the base material layer further contains a flame retardant.

6. The multilayered heat-recoverable article according to claim 1, wherein the base material layer does not contain a copper inhibitor.

7. A wire splice comprising:
a plurality of wires, each including a conductor and an insulating layer provided on the outside thereof; and
a tube obtained by heat-shrinking the multilayered heat-recoverable article according to claim 1 made to adhere to a joint in which the conductors of the plurality of wires are connected to each other.

8. A wire harness comprising:
a plurality of wires, each including a conductor and an insulating layer provided on the outside thereof; and
a tube obtained by heat-shrinking the multilayered heat-recoverable article according to claim 1 made to adhere to the plurality of wires.

* * * * *